United States Patent
O'Connell

(10) Patent No.: US 10,679,316 B2
(45) Date of Patent: Jun. 9, 2020

(54) SINGLE PASS PREFIX SUM IN A VERTEX SHADER

(71) Applicant: Advanced Micro Devices, Inc., Santa Clara, CA (US)

(72) Inventor: Sean M. O'Connell, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/007,893

(22) Filed: Jun. 13, 2018

(65) Prior Publication Data

US 2019/0385270 A1  Dec. 19, 2019

(51) Int. Cl.
  *G06T 1/20*   (2006.01)
  *G06T 15/00*  (2011.01)
  *G06T 11/00*  (2006.01)
  *G06T 11/20*  (2006.01)

(52) U.S. Cl.
  CPC .............. *G06T 1/20* (2013.01); *G06T 11/001* (2013.01); *G06T 11/203* (2013.01); *G06T 15/005* (2013.01); *G06T 2210/52* (2013.01)

(58) Field of Classification Search
  None
  See application file for complete search history.

(56) References Cited

U.S. PATENT DOCUMENTS

| | | | | |
|---|---|---|---|---|
| 6,016,150 A * | 1/2000 | Lengyel | ................. | G06T 11/001 345/426 |
| 6,111,584 A | 8/2000 | Murphy | | |
| 6,963,347 B1 * | 11/2005 | Selvaggi | ............... | G06T 15/005 345/619 |
| 7,656,416 B2 | 2/2010 | Demers et al. | | |
| 9,019,303 B2 | 4/2015 | Lee et al. | | |
| 2008/0198168 A1 * | 8/2008 | Jiao | ....................... | G06T 15/005 345/506 |
| 2011/0025693 A1 * | 2/2011 | Merry | ................... | G06T 11/203 345/442 |

(Continued)

OTHER PUBLICATIONS

Kubisch, Christoph, "OPENGL Blueprint Rendering", GPU Technology Conference, Apr. 47, 2016, 26 pages, NVIDIA. (Year: 2016).*

(Continued)

*Primary Examiner* — Xiao M Wu
*Assistant Examiner* — Steven Z Elbinger
(74) *Attorney, Agent, or Firm* — Kowert Hood Munyon Rankin and Goetzel PC; Rory D. Rankin

(57) ABSTRACT

Systems, apparatuses, and methods for implementing a single pass stipple pattern generation process are disclosed. A processor initiates parallel execution of a first and second plurality of wavefronts. A first wavefront of the first plurality of wavefronts converts a first local coordinate into a first global coordinate, wherein the first local coordinate corresponds to a first portion of a primitive. Also, a first wavefront of the second plurality of wavefronts applies a first attribute to the first global coordinate prior to a second wavefront, of the first plurality of wavefronts, converting a second local coordinate of a second portion of the primitive into a second global coordinate. The second plurality of wavefronts generate image data based on applying the first attribute to global coordinates generated by the first plurality of wavefronts, and the image data is conveyed for display on a display device.

20 Claims, 11 Drawing Sheets

(56) References Cited

U.S. PATENT DOCUMENTS

2012/0017062 A1* 1/2012 Goel ................... G06F 9/3851
                                                       711/170
2018/0293689 A1* 10/2018 McMullen ................ G06T 1/20

OTHER PUBLICATIONS

Blelloch, Guy E., "Chapter 1: Prefix Sums and Their Applications", Synthesis of Parallel Algorithms, Nov. 1990, pp. 35-60, https://www.cs.cmu.edu/~guyb/papers/Ble93.pdf. [Retrieved May 21, 2018].
Kubisch, Christoph, "OPENGL Blueprint Rendering", GPU Technology Conference, Apr. 47, 2016, 26 pages, NVIDIA, http://on-demand.gputechconf.com/gtc/2016/presentation/s6143-christoph-kubisch-blueprint-rendering.pdf. [Retrieved Mar. 28, 2018].

* cited by examiner

SINGLE PASS PREFIX SUM IN A VERTEX SHADER

BACKGROUND

Description of the Related Art

Parallel processors typically perform operations that operate on data in parallel, increasing the throughput of a computing system. For example, a parallel processor can simultaneously execute multiple wavefronts, with each wavefront including a plurality of threads. However, certain types of operations are unable to take full advantage of the parallel structure of parallel processors. For example, a traditional implementation of a line stippling operation on a parallel processor is typically performed in two passes. In a first pass, a prefix scan operation is performed. In a second pass, the first pass results are used to retrieve line stipple coordinates. A prefix sum operation is one type of prefix scan operation in which a given list of input elements are added together to generate a cumulative sum.

Parallel processors are often used as part of computer graphics processing systems to create computer-generated imagery from a geometric model. A geometric model defines various objects, details, lighting sources, and other elements of a virtual scene. The computing system determines how to render a given scene based on the geometric model and other inputs from a software application. A parallel processor typically includes a graphics processing pipeline that processes the inputs and the geometric model to generate a two or three dimensional array of pixel color values that represent the desired image or video frame.

In various graphics processing pipelines, a stippling (or line stippling) operation is performed to create a pattern simulating varying degrees of solidity or shading using small dots. Traditional line stippling requires that the accumulated pixel distance along a given line be calculated and stored in advance in order to calculate the stipple coordinate. In some implementations, a line stipple operation involves calculating a prefix sum to determine the pixel distance along a given line based on a projection of the cumulative distance of all of the preceding line segments. This forces a serialization of the line segment rasterization in the parallel processor.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
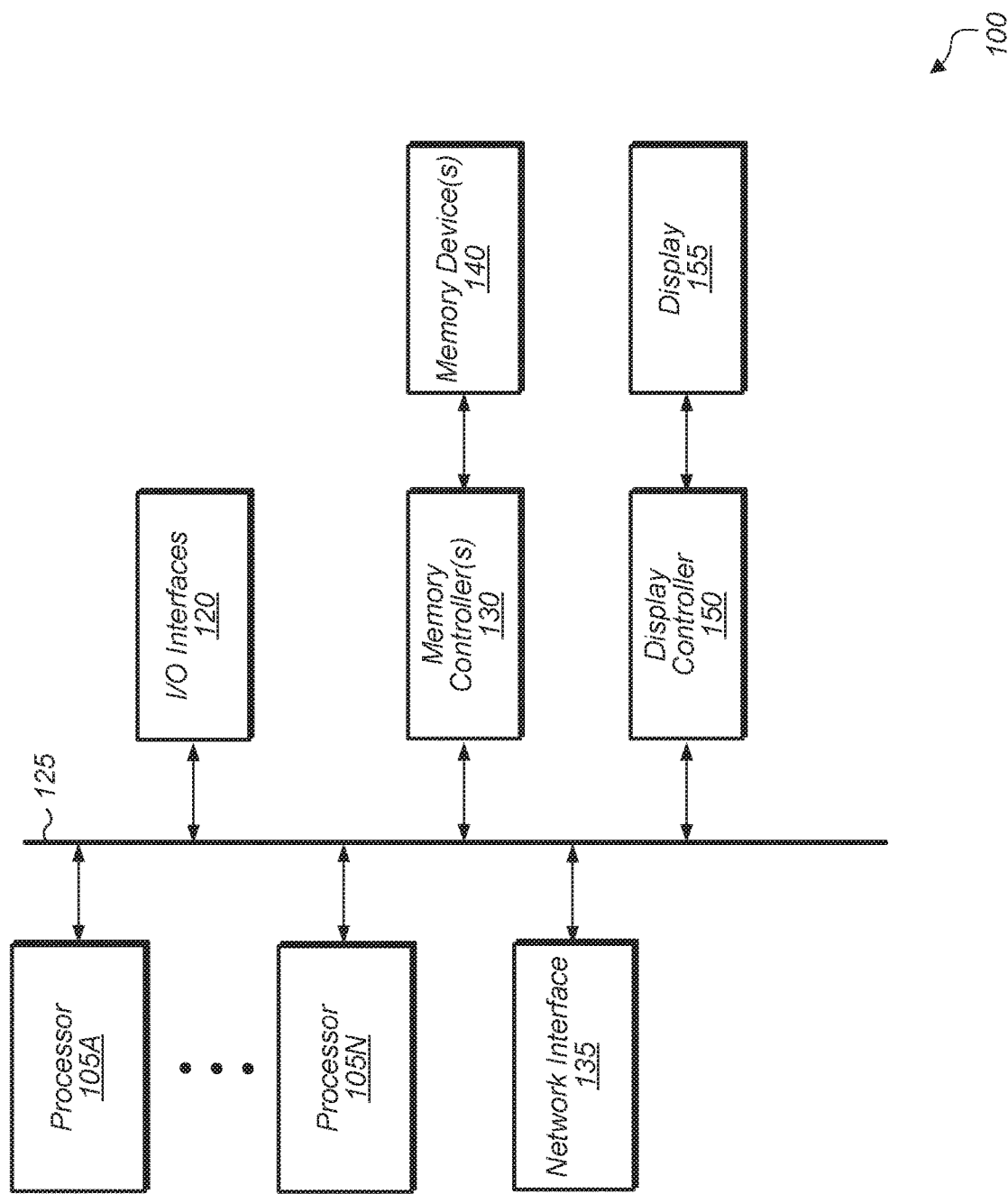
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a single pass prefix sum generator in a vertex shader are disclosed herein. A processor (e.g., graphics processing unit (GPU)) includes a command processor, dispatch unit, and a plurality of compute units. Each compute unit includes any number of execution units for executing compute and/or graphics processing tasks in parallel. In one implementation, the processor initiates parallel execution of a first and second plurality of wavefronts in parallel on the plurality of compute units. A first wavefront of the first plurality of wavefronts converts a first local coordinate into a first global coordinate, wherein the first local coordinate corresponds to a first portion of a primitive. In one implementation, converting a local coordinate into a global coordinate comprises adding the local coordinate to a global value, wherein the global value represents a cumulative value of prior local coordinates. Also, a first wavefront of the second plurality of wavefronts applies a first attribute to the first global coordinate prior to a second wavefront, of the first plurality of wavefronts, converting a second local coordinate of a second portion of the primitive into a second global coordinate. In one implementation, applying a first attribute comprises applying a stipple pattern to the first global coordinate. In this implementation, the first global coordinate is used as an index into the stipple pattern to determine which bit(s) of the stipple pattern to apply to corresponding pixel(s). The second plurality of wavefronts generate image data based on applying the first attribute to global coordinates generated by the first plurality of wavefronts, and the image data is conveyed for display on a display device.

In one implementation, the first plurality of wavefronts are launched in parallel on the plurality of compute units, and each wavefront is assigned an in-order, ascending range of vertex identifiers (IDs) to process. In one implementation, ordered synchronization between the concurrent wavefronts is implemented using spin locks and atomic operations. In this implementation, two atomic counters are allocated. The values tracked by these atomic counters include a next vertex index and an accumulated sum. The next vertex index counter specifies which wavefront is able to proceed for the relevant operation when the lowest thread ID is equal to the next vertex index counter. The wavefront ID which proceeds adds its local prefix sum to a global summation value (i.e., accumulated sum).

In one implementation, each wavefront implements a spinlock waiting for the next vertex index counter to be equal to the vertex ID assigned to the lowest vertex ID assigned to any of its threads. Once the next vertex index counter is equal to the vertex ID assigned to the lowest thread ID of the wavefront, the wavefront adds its local prefix sum to the accumulated sum counter. Then, the wavefront updates the next vertex index counter to be equal to one added to the maximum vertex ID among its local threads. The next wavefront will detect that the next vertex index counter is now equal to the vertex ID of its first thread, allowing the next wavefront to proceed. This pattern will continue until all wavefronts have added their local prefix sum to the accumulated sum counter.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides a plurality of pixels to display controller 150 to be driven to display 155.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
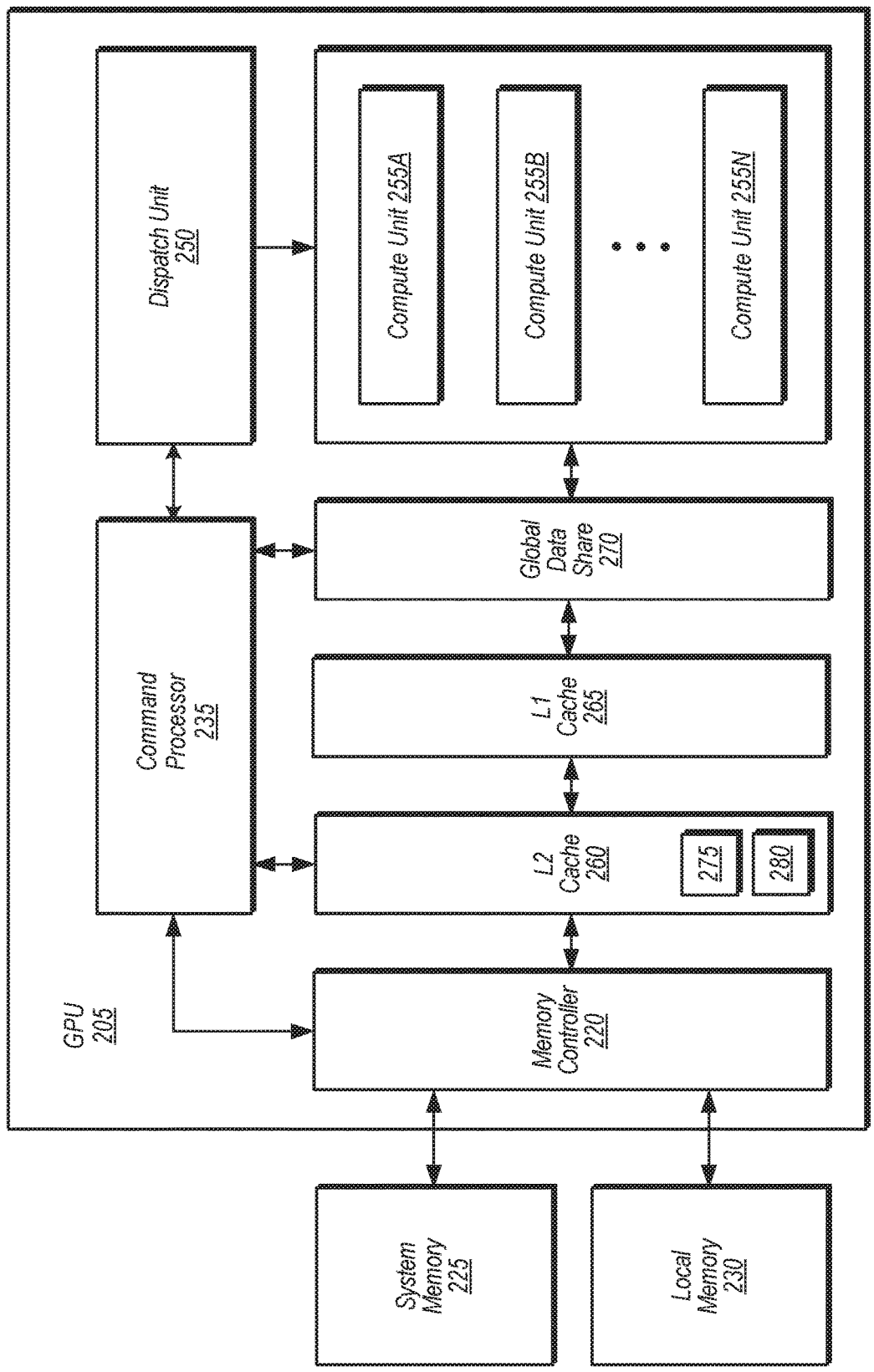
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners.

In various implementations, computing system 200 executes any of various types of software applications. In one implementation, as part of executing a given software application, a host CPU (not shown) of computing system 200 launches kernels to be performed on GPU 205. Each kernel is mapped to any number of wavefronts. Command processor 235 receives kernels from the host CPU and issues kernels to dispatch unit 250 for dispatch to compute units 255A-N. Each compute unit 255A-N includes any number of execution units for executing instructions in parallel, with the number of execution units per compute unit varying according to the implementation. Threads within kernels executing on compute units 255A-N read and write data to global data share 270, L1 cache 265, and L2 cache 260 within GPU 205. For example, in one implementation, threads write to atomic counters 275 and 280 within L2 cache 260. In one implementation, atomic counter 275 stores a next index value, while atomic counter 280 stores a global summation value. In this implementation, atomic counter 275 stores a value of the next index to process by wavefronts executing on compute units 255A-N. In one implementation, this value is referred to as a next vertex index. Although not shown in FIG. 2, in one implementation, compute units 255A-N also include one or more caches and/or local memories within each compute unit 255A-N.

Figure 3:
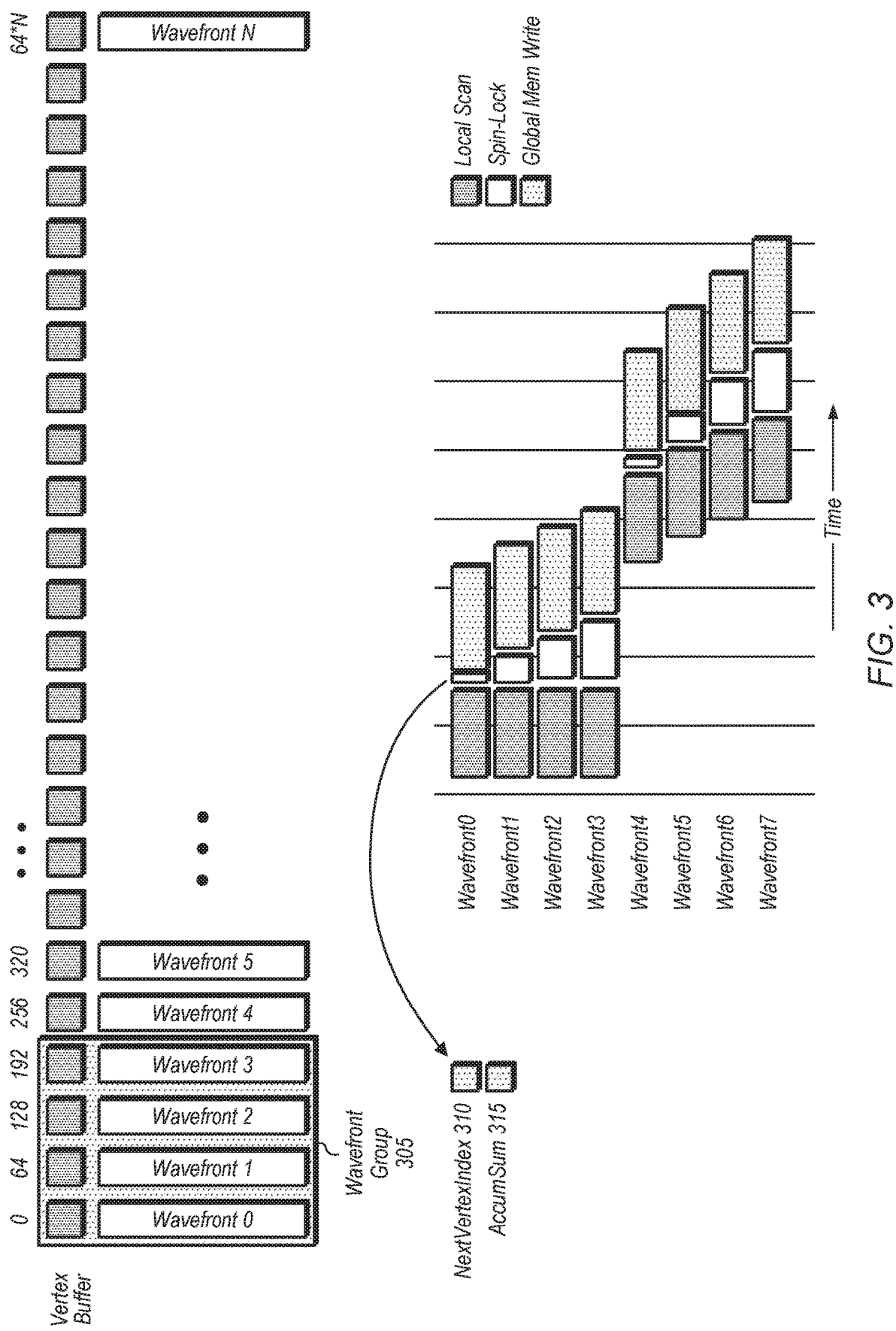
FIG. 3 is a block diagram of one implementation of using a vertex shader for generating a prefix sum.

Referring now to FIG. 3, a block diagram of one implementation of using a vertex shader for generating a prefix sum is shown. A plurality of wavefronts are launched in parallel on a vertex shader of a parallel processor (e.g., GPU 205 of FIG. 2), with each wavefront generating a local prefix sum. As used herein, a "vertex shader" is defined as a shader stage in a graphics processing pipeline that handles the processing of individual vertices. A vertex shader receives a vertex stream to process, with the vertex stream consisting of an ordered sequence of vertices. Wavefront group 305 is an example of a plurality of wavefronts that are launched in parallel on the vertex shader. In one implementation, wavefront group 305 includes four wavefronts (wavefronts 0-3). In one implementation, each wavefront includes 64 threads. In other implementations, a wavefront group includes other numbers of wavefronts and/or each wavefront includes other numbers of threads. After wavefront group 305 executes, the next wavefront (wavefronts 4-7) group executes, followed by the subsequent wavefront (wavefronts 8-11), and so on.

At the bottom of FIG. 3, the different phases of wavefront execution are shown for wavefront group 305 and the subsequent wavefront group. Each wavefront 0-3 starts out by calculating a local prefix sum, with this calculation referred to as a local scan phase. In one implementation, the local prefix sum is the projection of a line segment being rasterized by wavefront group 305. Then, each wavefront 0-3 executes a spin-lock phase while the respective wavefront waits for the value of NextVertexIndex 310 to equal the value of the first thread in the respective wavefront. Once the value of NextVertexIndex 310 is equal to the value of the first thread of a given wavefront, the given wavefront implements a global memory write phase to add its local prefix sum to AccumSum 315, which stores the accumulated sum value for all of the wavefronts. After adding its local prefix sum to AccumSum 315, the given wavefront increments NextVertexIndex 310 to be equal to one greater than its thread with the highest index. The next wavefront detects that the value of NextVertexIndex 310 is equal to the value of its first thread, the next wavefront adds its local prefix sum to AccumSum 315 and updates the value of NextVertexIndex 310, triggering the subsequent wavefront, and so on. Wavefronts 4-7 will follow the same pattern as wavefronts 0-3 for executing the different phases of local scan, spin-lock, and global memory write.

Figure 4:
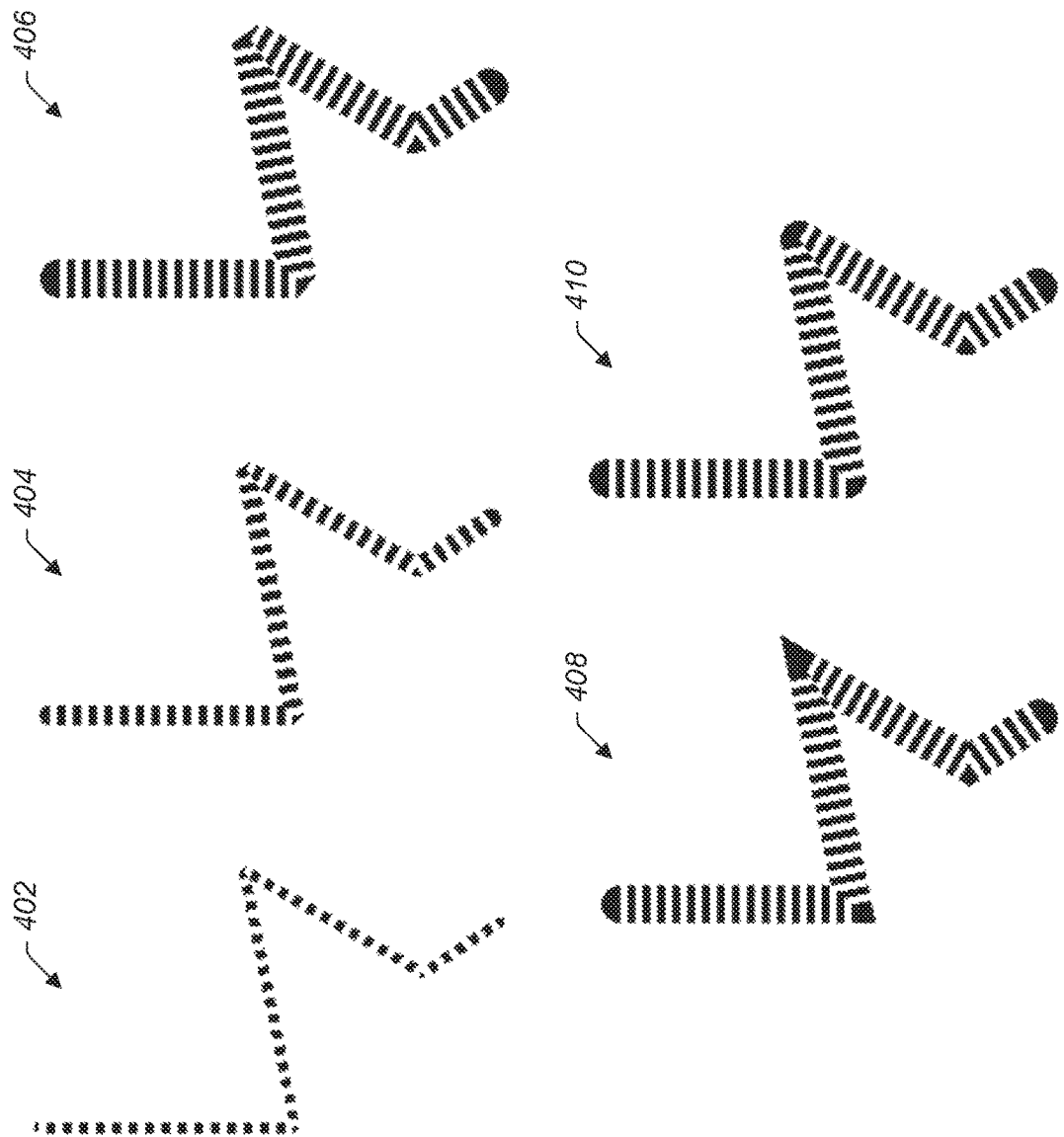
FIG. 4 illustrates diagrams of multiple different stipple patterns.

Turning now to FIG. 4, diagrams of multiple different stipple patterns are shown. In one implementation, a GPU (e.g., GPU 205 of FIG. 2) or other type of processor performs a line stipple operation to generate a particular type of pattern along a line being rasterized. Depending on the implementation, any of various line stipple pattern styles are utilized by the GPU. For example, the line stipple pattern shown in diagram 402 is employed in one particular implementation. In other implementations, any of the patterns shown in diagrams 404, 406, 408, and 410 are employed by the GPU.

The pattern used by a thread on a given line segment will need to be continued by the next thread which is rasterizing the next segment of the line. Accordingly, each thread needs to know the distance being projected and where in the pattern the previous segment finishes so that the continuity of the line stipple pattern is maintained. In one implementation, when performing a line stipple operation, a plurality of wavefronts are launched in parallel on the GPU. Each wavefront includes a plurality of threads, and each thread operates on a different segment of the line being rasterized. The wavefronts calculate local prefix sums by projecting the distances of the line segments being rasterized. The GPU maintains an atomic index counter and when the atomic index counter reaches the index of the first thread of a given wavefront, the given wavefront updates a global prefix sum by adding its local prefix sum to the global prefix sum. Then, the given wavefront increments the atomic index counter to the value of the next wavefront which is rasterizing subsequent line segments of the line. The term "atomic counter" refers to a counter that is only able to be updated by a single thread at any given time. This prevents multiple threads from accessing the atomic counter at the same time. In one implementation, the atomic index counter is implemented in a level-two (L2) cache. In other implementations, the atomic index counter is implemented in other locations.

Figure 5:
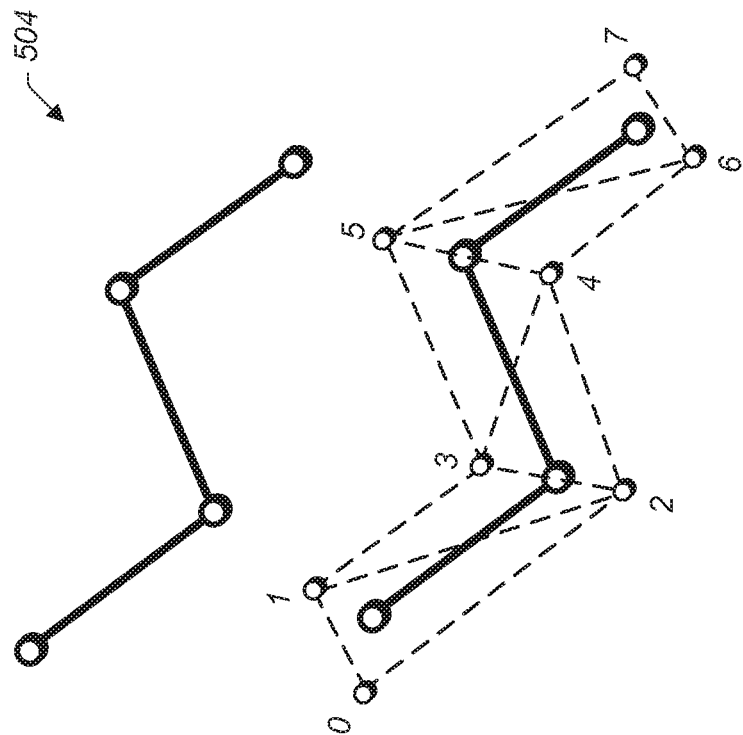
FIG. 5 illustrates examples of line segments of a line being rasterized.
Figure 5:
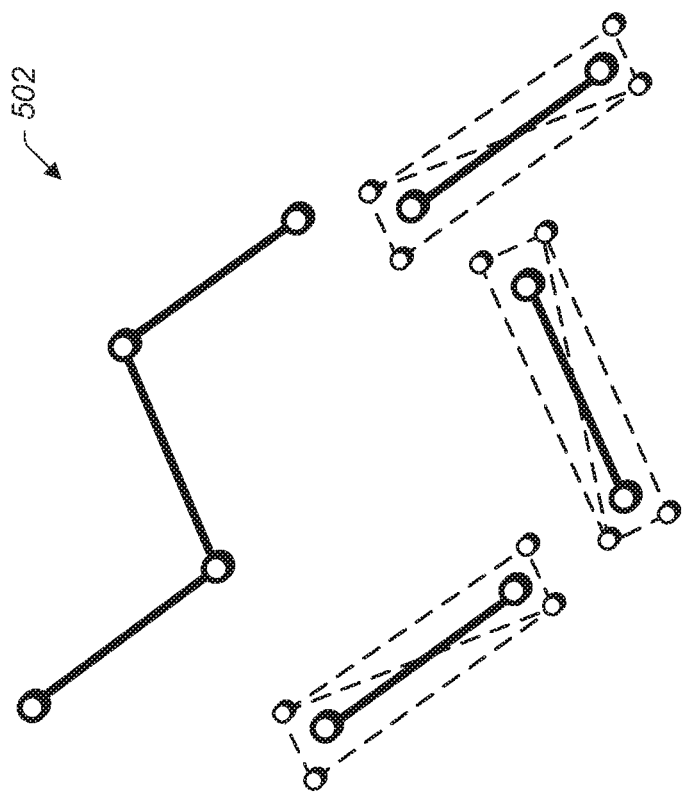

Referring now to FIG. 5, examples of line segments of a line being rasterized are shown. For example, in one implementation, line 502 is partitioned into three segments and six vertex shader threads are dispatched for each line segment. An output triangle list is generated by the six vertex shader threads. Then, a line stipple pattern is generated for each of the three segments with the same pattern continuing at the points which adjoin adjacent segments.

In another implementation, as shown for line 504, two vertex shader threads are dispatched per vertex of vertices 0-7. An output triangle strip is generated by each of the vertex shader threads. As used herein, a "triangle strip" is defined as a series of connected triangles sharing vertices. Joint vertex locations are calculated as intersections of neighboring line segments. It should be understood that the example of lines 502 and 504 having three segments are shown merely for illustrating purposes. Other lines with other numbers of segments will be rasterized with any of various line stipple patterns in other implementations.

Figure 6:
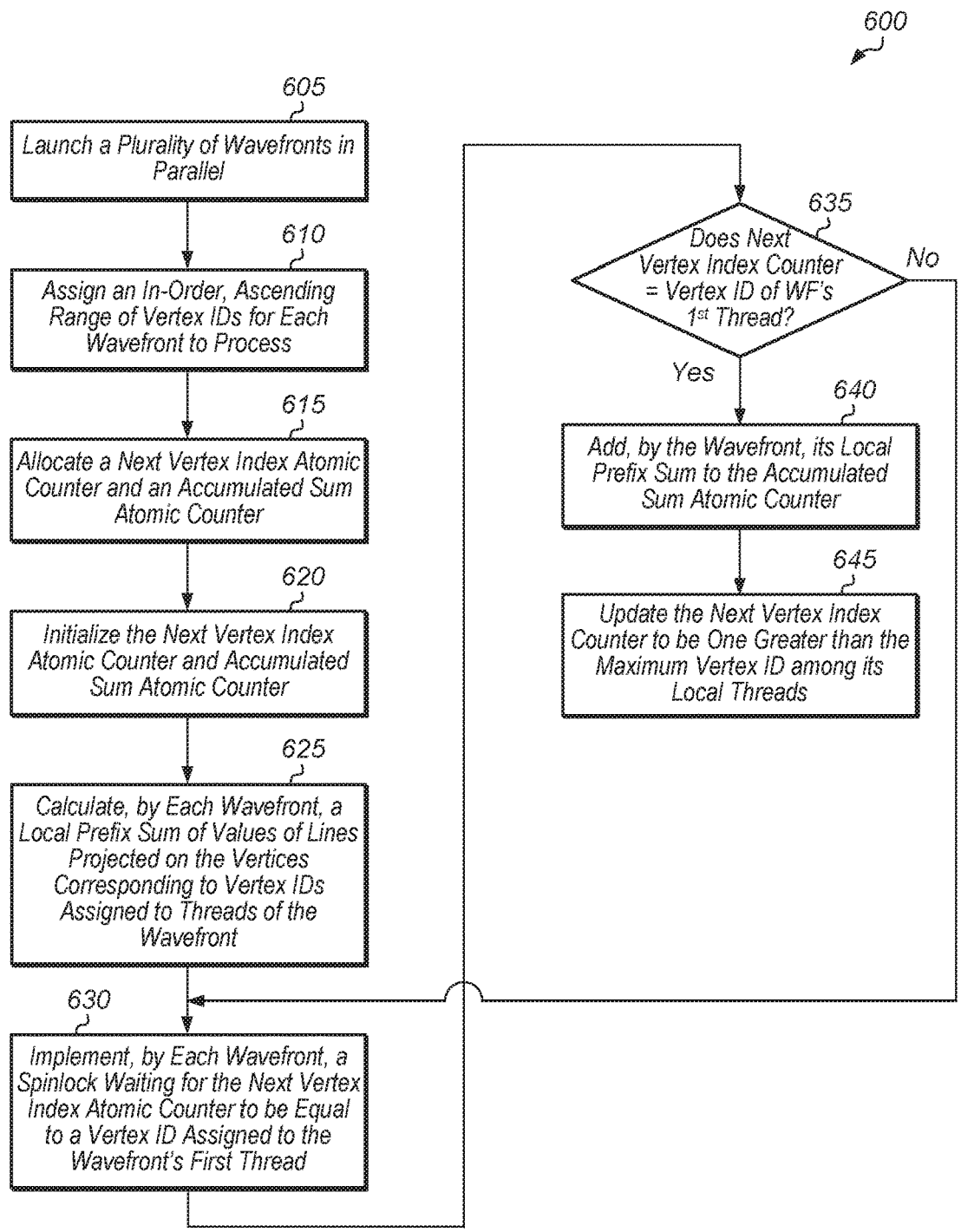
FIG. 6 is a generalized flow diagram illustrating one implementation of a method for implementing a single-pass prefix sum in a vertex shader.
Figure 7:
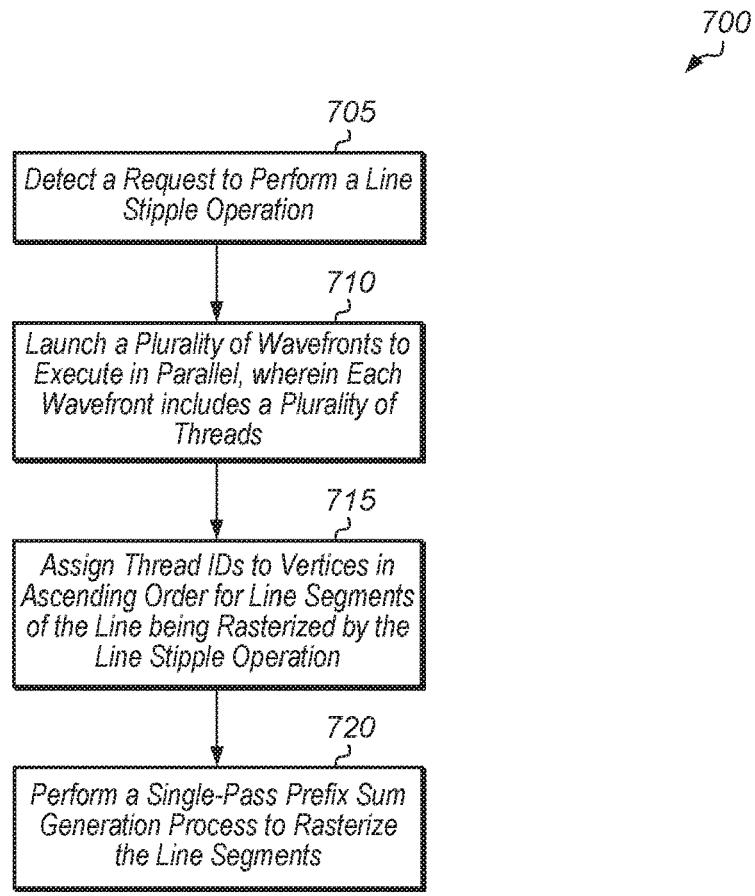
FIG. 7 is a generalized flow diagram illustrating one implementation of a method for performing a line stipple operation.
Figure 8:
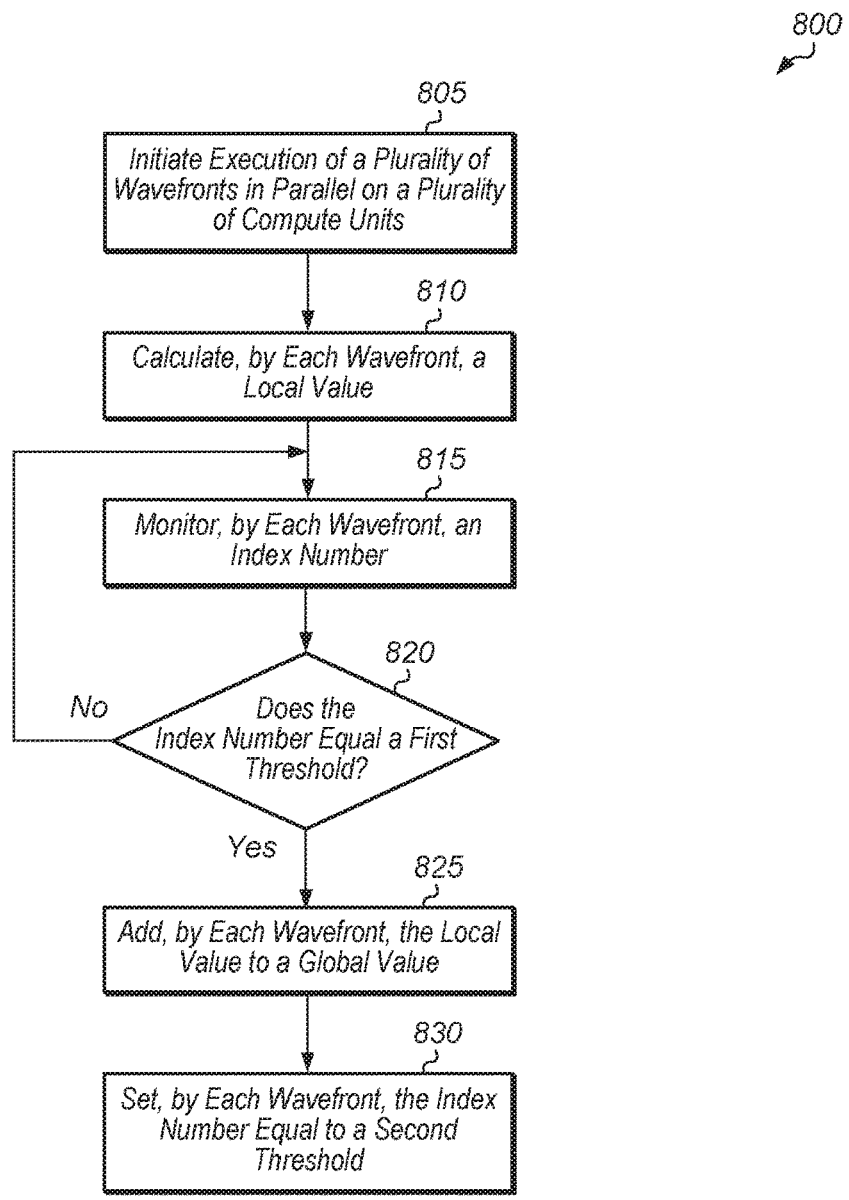
FIG. 8 is a generalized flow diagram illustrating one implementation of a method for executing wavefronts in parallel to perform a single-pass global value generation process.

Turning now to FIG. 6, one implementation of a method 600 for implementing a single-pass prefix sum in a vertex shader is shown. For purposes of discussion, the steps in this implementation and those of FIG. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A parallel processor launches a plurality of wavefronts in parallel (block 605). Each wavefront includes a plurality of threads. The parallel processor assigns an in-order, ascending range of vertex IDs for each wavefront to process (block 610). Also, the parallel processor allocates a next vertex index atomic counter and an accumulated sum atomic counter (block 615). The parallel processor initializes the next vertex index atomic counter and the accumulated sum atomic counter (block 620).

Each wavefront calculates a local prefix sum of values of lines projected on the vertices corresponding to vertex IDs assigned to threads of the wavefront (block 625). The local prefix sum includes a cumulative distance of the line segments being rasterized by the threads of the respective wavefront. Each wavefront also implements a spinlock waiting for the next vertex index atomic counter to be equal to the vertex ID assigned to the wavefront's first thread (block 630). As used herein, a "spinlock" is defined as a lock where a thread waits in a loop until the lock becomes available. The parallel processor maintains a spinlock for exclusive access of the next vertex index atomic counter and accumulated sum atomic counter by a thread or wavefront of the plurality of wavefronts.

If the next vertex index atomic counter is equal to the vertex ID assigned to the wavefront's first thread (conditional block 635, "yes" leg), then the wavefront adds its local prefix sum to the accumulated sum atomic counter (block 640). The accumulated sum atomic counter stores the global prefix sum which is an accumulation of all previous wavefronts' local prefix sums. Also, the wavefront updates the next vertex index counter to be one greater than the maximum vertex ID among its local threads (block 645). If the next vertex index atomic counter is less than the vertex ID assigned to the wavefront's first thread (conditional block 635, "no" leg), then method 600 returns to block 630. Method 600 ends when all wavefronts have completed execution and added their local prefix sums to the global accumulated sum counter.

Referring now to FIG. 7, one implementation of a method 700 for performing a line stipple operation is shown. A processor detects a request to perform a line stipple operation (block 705). In response to detecting the request, the processor launches a plurality of wavefronts to execute in parallel, wherein each wavefront includes a plurality of threads (block 710). The processor assigns thread IDs to vertices in ascending order for line segments of the line being rasterized by the line stipple operation (block 715). Then, the processor performs a single-pass prefix sum generation process to rasterize the line segments (block 720). One example of a single-pass prefix sum generation process is described in method 600 (of FIG. 6). After block 720, method 700 ends.

Turning now to FIG. 8, one implementation of a method 800 for executing wavefronts in parallel to perform a single-pass global value generation process is shown. A processor initiates execution of a plurality of wavefronts in parallel on a plurality of compute units (block 805). Each wavefront calculates a local value (block 810). In one implementation, the local value is a projected distance of a plurality of line segments. In other implementations, the local value is any of various other types of values. Also, each wavefront monitors an index number (block 815). In one implementation, the index number corresponds to a next vertex to process. In other implementations, the index number corresponds to any of various other types of values.

If the index number equals a first threshold (conditional block 820, "yes" leg), then each wavefront adds the local value to a global value (block 825). In one implementation, the first threshold is equal to a thread number of a first thread of the wavefront. In other implementations, the first threshold is set equal to any of various other values. In one implementation, the global value is an accumulation of all previous wavefronts' local values. If the index number does not equal the first threshold (conditional block 820, "no" leg), then method 800 returns to block 815. After block 825, each wavefront sets the index number equal to a second threshold (block 830). After block 830, method 800 ends. In one implementation, the second threshold is equal to one greater than a highest thread number of the wavefront. In other words, the second threshold is equal to a first thread number of a subsequent wavefront. In other implementations, the second threshold is set equal to any of various other values.

Figure 9:
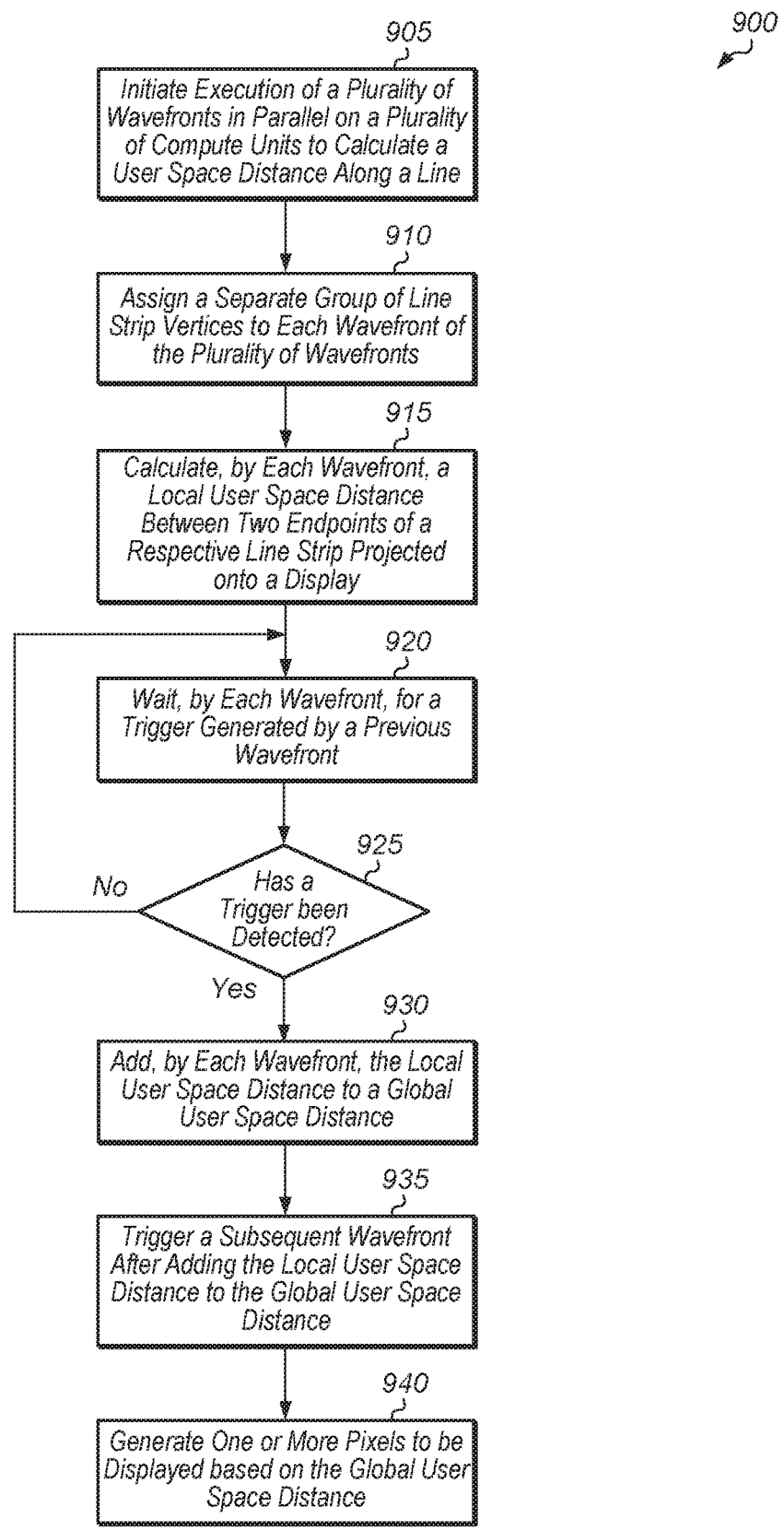
FIG. 9 is a generalized flow diagram illustrating one implementation of a method for calculating a user space distance along a line.

Referring now to FIG. 9, one implementation of a method 900 for calculating a user space distance along a line is shown. A processor initiates execution of a plurality of wavefronts in parallel on a plurality of compute units to calculate a user space distance along a line (block 905). In one implementation, the user space distance refers to the pixel distance of the line projected onto a display. In other implementations, the user space distance refers to the distance of the line projected into other spaces (e.g., 3D world space). The processor also assigns a separate group of line strip vertices to each wavefront of the plurality of wavefronts (block 910). Depending on the implementation, the line strip vertices are endpoints of a line strip, vertices of triangles corresponding to the line strip, or otherwise. Each wavefront calculates a local user space distance between two endpoints of a respective line strip projected onto a display (block 915). Then, each wavefront (other than a first wavefront) waits for a trigger generated by a previous wavefront (block 920). In one implementation, the ordering of wavefronts is determined by the vertex IDs assigned to the wavefronts. In one implementation, the trigger is a next index counter being set to an ID of a first thread of the wavefront. In other implementations, other types of triggers are utilized.

If a trigger has not been detected (conditional block 925, "no" leg), then method 900 returns to block 920. Otherwise, if a trigger has been detected (conditional block 925, "yes" leg), then the wavefront adds the local user space distance to a global user space distance (block 930). The global user space distance corresponds to a distance projected onto a display from a starting endpoint of the line to the respective line strip. In other words, the global user space distance is an accumulation of all of the local user space distances of all of the preceding line strips processed by previous wavefronts. Next, the wavefront (except for the last wavefront) triggers a subsequent wavefront after adding the local user space distance to the global user space distance (block 935). After block 935, the processor generates one or more pixels to be displayed based on the global user space distance (block 940). After block 940, method 900 ends.

Figure 10:
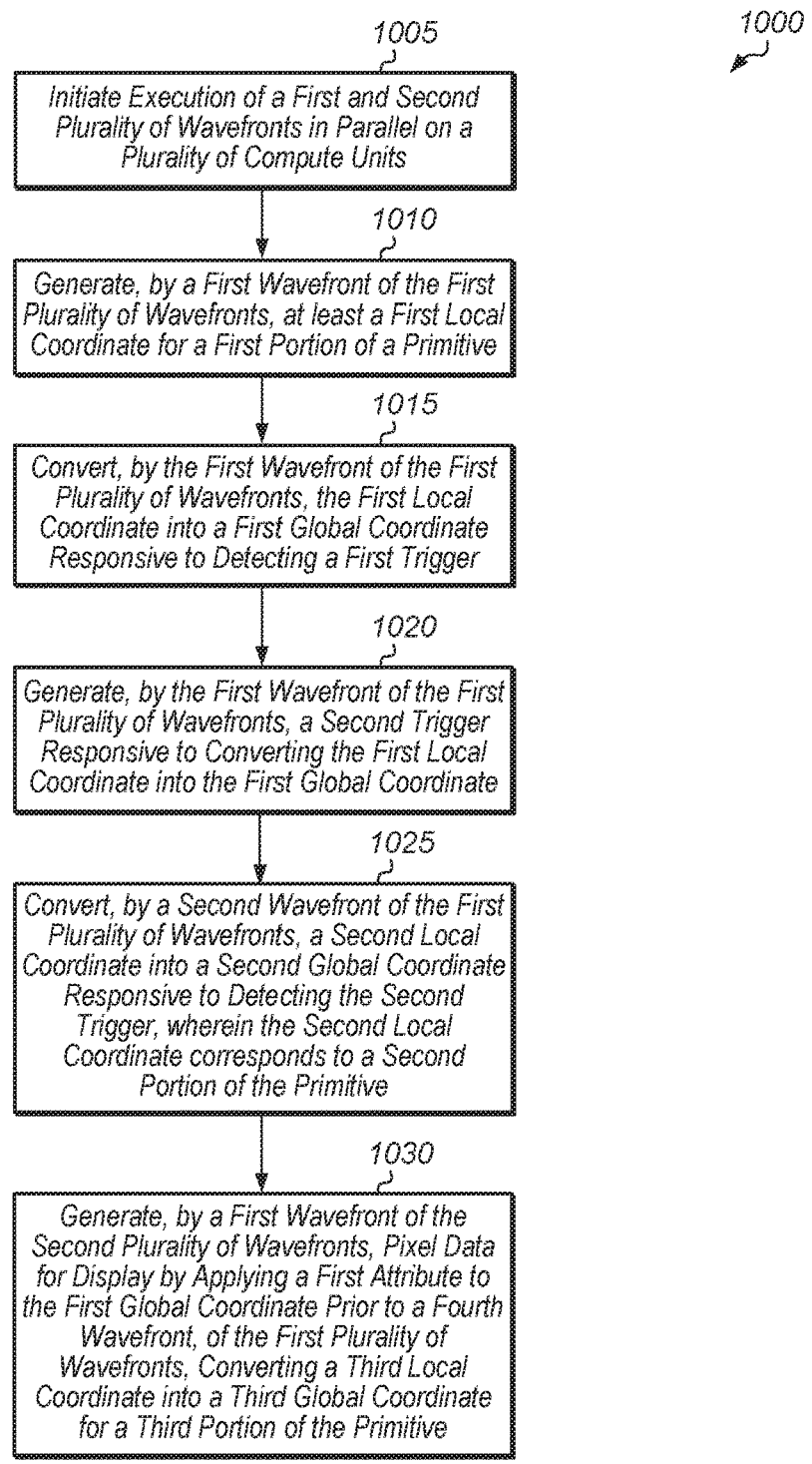
FIG. 10 is a generalized flow diagram illustrating one implementation of a method for generating pixel data in a single pass based on applying attributes to global coordinate data.

Turning now to FIG. 10, one implementation of a method 1000 for generating pixel data in a single pass based on applying attributes to global coordinate data is shown. A processor initiates execution of a first and second plurality of wavefronts in parallel on a plurality of compute units (block 1005). In one implementation, the first plurality of wavefronts are vertex shader wavefronts and the second plurality of wavefronts are fragment shader wavefronts. A first wavefront, of the first plurality of wavefronts, generates at least a first local coordinate for a first portion of a primitive, wherein the first local coordinate is local with respect to calculations performed by the first wavefront (block 1010). In other words, the first local coordinate is generated with respect to a portion of an entire image. In one implementation, the primitive is a line, and the first local coordinate is a projection of a line segment onto a particular user or screen space. In some cases, the first wavefront, of the first plurality of wavefronts, generates a plurality of local coordinates for a plurality of portions of the primitive. In one implementation, each wavefront of the first plurality of wavefronts calculates one or more local coordinates for one or more corresponding portions of the primitive.

Next, the first wavefront converts the first local coordinate into a first global coordinate responsive to detecting a first trigger (block 1015). In one implementation, the first trigger is an index value reaching a value of a first thread ID of the first wavefront. In other implementations, other types of triggers are utilized. In one implementation, the first wavefront retrieves a global value from a cache or other memory subsystem and then adds the first local coordinate to the global value to generate the first global coordinate. In one implementation, the global value is a cumulative stipple coordinate value calculated for previous portions of the primitive, and the first global coordinate is used as a stipple coordinate. This stipple coordinate is then used to index into a stipple pattern. In other implementations, the first global coordinate corresponds to other types of global coordinate data. Then, the first wavefront generates a second trigger responsive to converting the first local coordinate into the first global coordinate (block 1020). In one implementation, the first wavefront generates the second trigger by incrementing an index counter to a value which is one greater than a highest thread ID of the first wavefront. In other implementations, the second trigger is any of various other types of triggers.

Next, a second wavefront, of the first plurality of wavefronts, converts a second local coordinate into a second global coordinate responsive to detecting the second trigger, wherein the second local coordinate corresponds to a second portion of the primitive (block 1025). Also, a first wavefront, of the second plurality of wavefronts, generates pixel data for display by applying a first attribute to the first global coordinate prior to a fourth wavefront, of the plurality of wavefronts, converting a third local coordinate for a third portion of the primitive (block 1030). In one implementation, the first attribute is a stipple pattern which is being applied to the primitive. In other implementations, the first attribute is any of various other types of attributes. In one implementation, the first wavefront of the second plurality of wavefronts generates pixel data for display by applying the first attribute to the first global coordinate in response to detecting the second trigger. In another implementation, the first wavefront of the second plurality of wavefronts generates pixel data for display by applying the first attribute to the first global coordinate in response to receiving the first global coordinate (or an indication that the first global coordinate is ready) from the first wavefront of the first plurality of wavefronts. It is noted that pixel data is generated for subsequent portions of the primitive in a similar manner by other wavefronts using the steps of method 1000. After block 1030, method 1000 ends.

Figure 11:
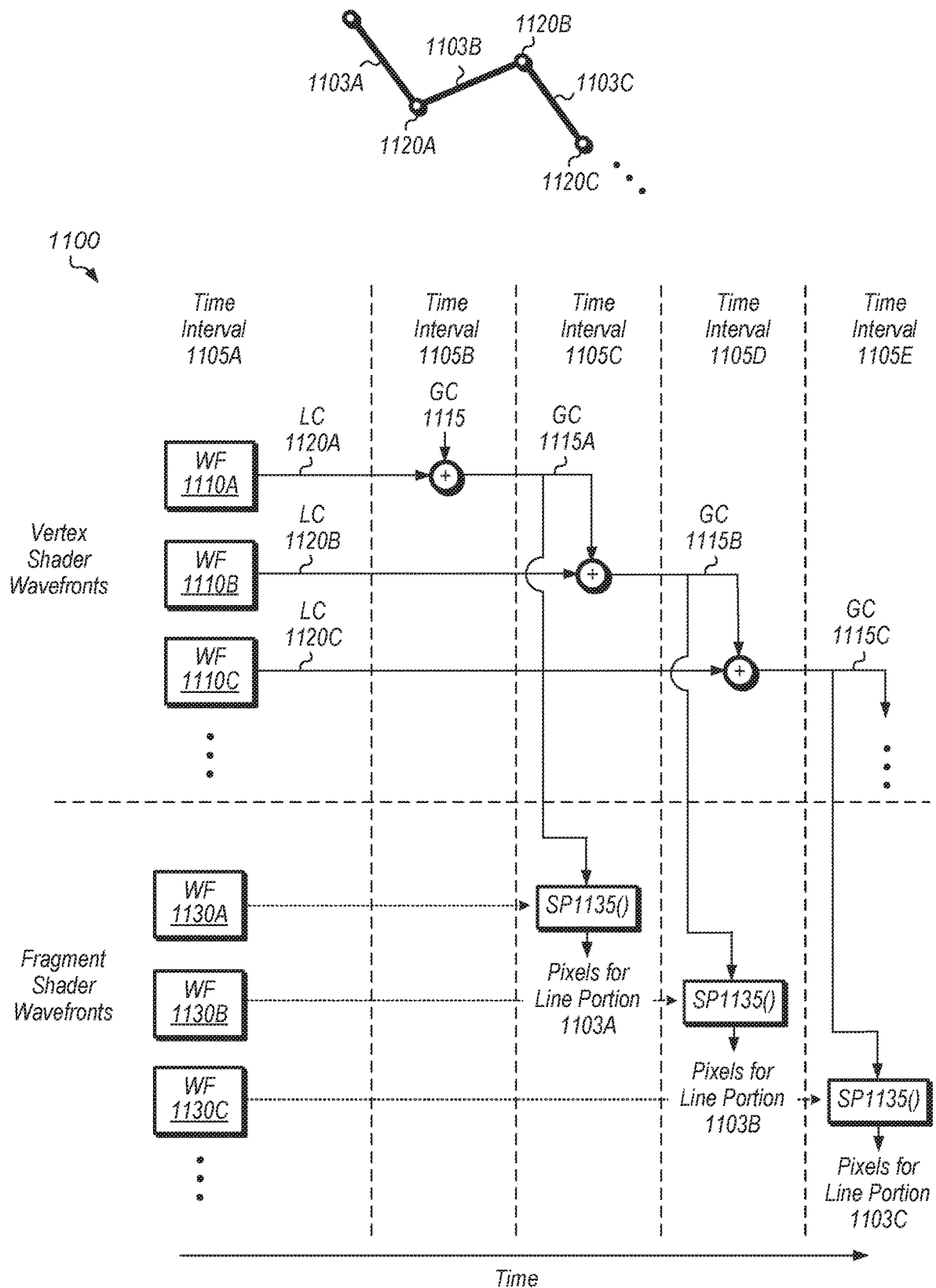
FIG. 11 illustrates one implementation of a timing diagram of a single pass stipple pattern generation process.

Referring now to FIG. 11, one implementation of a timing diagram 1100 of a single pass stipple pattern generation process is shown. In one implementation, a processor initiates execution of a plurality of vertex shader wavefronts (WFs) 1110A-N and a plurality of fragment shader wavefronts 1130A-N. It is noted that vertex shader wavefronts 1110A-N are also referred to herein as a "first plurality of wavefronts" and fragment shader wavefronts 1130A-N are also referred to herein as a "second plurality of wavefronts". It is noted that each time interval 1105A-N includes any number of clock cycles, with the number of clock cycles per interval varying according to the implementation. It is assumed for the purposes of this discussion that time interval 1105B is subsequent to time interval 1105A, time interval 1105C is subsequent to time interval 1105B, and so on.

In time interval 1105A, wavefronts 1110A-N calculate one or more local coordinates (LC) 1120A-N for corresponding line portions 1103A-N. It is noted that in one implementation, each line portion 1103A-N is partitioned into a plurality of line strips. In this implementation, each wavefront 1110A-N includes a plurality of threads to calculate a plurality of local coordinates 1120A-N for the plurality of line strips. In other implementations, wavefronts 1110A-N calculate local coordinates 1120A-N for other types of primitives besides lines.

In one implementation, wavefronts 1110A-N retrieve batches of vertex data for each corresponding line portion 1103A-N, and then wavefronts 1110A-N process the vertex data to generate a projected distance of a corresponding line portion 1103A-N, For example, wavefront 1110A calculates local coordinate(s) 1120A, wavefront 1110B calculates local coordinate(s) 1120B, and so on. In one implementation, each local coordinate 1120A-N is a projected distance of the line portion onto a particular user space (e.g., screen space). This projected distance only applies to the particular line portion and does not account for the distances of previous line portions. In one implementation, each wavefront 1110A-N is able to perform these calculations in time interval 1105A.

Then, in time interval 1105B, wavefront 1110A adds a global coordinate (GC) 1115 to the one or more local coordinate(s) 1120A which were calculated by wavefront 1110A in time interval 1105A. The sum of global coordinate 1115 and local coordinate 1120A is referred to as global coordinate 1115A. In one implementation, global coordinate 1115 is a stipple coordinate. In other implementations, global coordinate 1115 represents other types of attributes which are applied to line portions 1103A-N.

In one implementation, global coordinate 1115 is provided by a wavefront that executed prior to wavefront 1110A, and in this implementation, global coordinate 1115 represents the cumulative projected distance of the line that has already been processed. In another implementation, wavefront 1110A is the first wavefront to process the line, in which case global coordinate 1115 is equal to zero. In time interval 1105B, wavefront 1110A generates global coordinate 1115A by adding the total projected distance of line segment 1103A to the previous global coordinate 1115. Wavefront 1110A then provides global coordinate 1115A to wavefront 1110B and to wavefront 1130A. When wavefront 1110A processes a plurality of line strips within line portion 1103A, wavefront 1110A provides multiple global coordinate values 1115A to wavefront 1130A.

In time interval 1105C, wavefront 1110B adds its own local coordinate 1120B to global coordinate 1115A to generate global coordinate 1115B. Also in time interval 1105C, wavefront 1130A uses global coordinate(s) 1115A to index into stipple pattern (SP) 1135 for generating pixels for line portion 1103A. While stipple pattern 1135 is utilized in one implementation for generating pixels for line portion 1103A, it is noted that in other implementations, other attributes are applied to global coordinate(s) 1115A to generate pixels for display. It is also noted that wavefront 1130A generates pixels for line portion 1103A prior to wavefront 1110C converting local coordinate 1120C into global coordinate 1115C. This is advantageous because prior art approaches waited until all of the local coordinates for a given primitive were converted into global coordinates before applying an attribute to the global coordinates so as to generate pixels for display. In other words, in the prior art, the fragment shaders were not initiated until all of the primitive's local coordinates were converted into global converters.

Continuing with the same series of operations, in time interval 1105D, wavefront 1110C converts local coordinate 1120C into global coordinate 1115C. Also during time interval 1105D, wavefront 1130B generates pixels for line portion 1103B by applying stipple pattern 1135 to global coordinate(s) 1115B. Similarly, in time interval 1105E, wavefront 1130C generates pixels for line portion 1103C by applying stipple pattern 1135 to global coordinate(s) 1115C. This series of operations continues for the rest of wavefronts 1110A-N and wavefronts 1130A-N until all remaining line portions are processed.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a plurality of compute units; and
a dispatch unit comprising circuitry configured to initiate execution of a first and second plurality of wavefronts in parallel on the plurality of compute units, wherein each of the second plurality of wavefronts comprise program instructions executable to generate image data corresponding to an image;
wherein a first wavefront of the first plurality of wavefronts is configured to convert a first local coordinate into a first global coordinate, wherein the first local coordinate is generated with respect to a first portion of a primitive of the image and the first global coordinate is generated with respect to an entirety of the primitive and is equal to the first local coordinate added to a global value;
wherein a first wavefront of the second plurality of wavefronts is configured to apply a first attribute to the first global coordinate, prior to a second wavefront of the first plurality of wavefronts converting a second local coordinate of a second portion of the primitive into a second global coordinate; and
an interface to convey the image data for display on a display device.

2. The processor as recited in claim 1, wherein:
the first global coordinate is a stipple coordinate; and
generating the first local coordinate comprises projecting a distance of the first portion of the primitive onto a screen space representative of the display device.

3. The processor as recited in claim 1, wherein the primitive is a line.

4. The processor as recited in claim 3, wherein:
the first wavefront, of the first plurality of wavefronts, processes the first portion of the line;
the second wavefront, of the first plurality of wavefronts, processes the second portion of the line;
the second portion is adjacent to the first portion;
the first wavefront, of the second plurality of wavefronts, maintains continuity between the first portion and the second portion by applying a line stipple pattern to the second portion; and
the line stipple pattern is determined based on the first global coordinate after the first wavefront, of the first plurality of wavefronts, adds the first local coordinate to the global value.

5. The processor as recited in claim 1, wherein:
the circuitry of the dispatch unit is configured to initiate execution of the first and second plurality of wavefronts responsive to detecting a request to perform a line stipple operation;
each wavefront, of the second plurality of wavefronts, comprises program instructions which are executable by a given compute unit to apply a line stipple pattern to a plurality of line segments being rasterized by the plurality of threads of a corresponding wavefront of the first plurality of wavefronts;
the first plurality of wavefronts are vertex shader wavefronts; and
the second plurality of wavefronts are fragment shader wavefronts.

6. The processor as recited in claim 1, wherein each wavefront of the first plurality of wavefronts is assigned an in-order, ascending range of vertex identifiers (IDs), wherein each wavefront of the first plurality of wavefronts comprises program instructions which are executable by a given compute unit to process vertices corresponding to the range of vertex IDs to calculate projected distances of a plurality of portions of the primitive.

7. The processor as recited in claim 1, wherein:
an index number and the global value are maintained by atomic counters;
each wavefront of the first plurality of wavefronts comprises program instructions which are executable by a given compute unit to implement a spinlock waiting for the index number to equal a first threshold;
the first threshold is equal to a thread number of a first thread of the wavefront;
each wavefront of the first plurality of wavefronts comprises program instructions which are executable by a given compute unit to update the global value responsive to the index number equaling the first threshold; and
each wavefront of the first plurality of wavefronts comprises program instructions which are executable by a given compute unit to set the index number equal to a second threshold responsive to updating the global value, wherein the second threshold is equal to a thread number of a first thread of a subsequent wavefront.

8. A method comprising:
initiating execution of a first and second plurality of wavefronts in parallel on a plurality of compute units, wherein each wavefront of the second plurality of wavefronts comprise program instructions executable to generate image data corresponding to an image;
converting, by a first wavefront of the first plurality of wavefronts, a first local coordinate into a first global coordinate, wherein the first local coordinate is generated with respect to a first portion of a primitive of the image and the first global coordinate is generated with respect to an entirety of the primitive and is equal to the first local coordinate added to a global value;
applying, by a first wavefront of the second plurality of wavefronts, a first attribute to the first global coordinate, prior to a second wavefront of the first plurality of wavefronts converting a second local coordinate of a second portion of the primitive into a second global coordinate; and
conveying the image data for display on a display device.

9. The method as recited in claim 8, wherein:
the first global coordinate is a stipple coordinate; and
generating the first local coordinate comprises projecting a distance of the first portion of the primitive onto a screen space representative of the display device.

10. The method as recited in claim 8, wherein the primitive is a line.

11. The method as recited in claim 10, wherein:
the first wavefront, of the first plurality of wavefronts, processes the first portion of the line;
the second wavefront, of the first plurality of wavefronts, processes the second portion of the line;
the second portion is adjacent to the first portion;

the first wavefront, of the second plurality of wavefronts, maintains continuity between the first portion and the second portion by applying a line stipple pattern to the second portion; and the line stipple pattern is determined based on the first global coordinate after the first wavefront, of the first plurality of wavefronts, adds the first local coordinate to the global value.

12. The method as recited in claim 8, wherein the first plurality of wavefronts are vertex shader wavefronts, wherein the second plurality of wavefronts are fragment shader wavefronts, and wherein the method further comprising:

initiating execution of the first and second plurality of wavefronts responsive to detecting a request to perform a line stipple operation;

applying, by each wavefront of the second plurality of wavefronts, a line stipple pattern to a given line segment, wherein the line stipple pattern is determined based on a corresponding global coordinate.

13. The method as recited in claim 8, wherein each wavefront of the first plurality of wavefronts is assigned an in-order, ascending range of vertex identifiers (IDs), and wherein the method further comprising processing vertices corresponding to the range of vertex IDs to calculate projected distances of a plurality of portions of the primitive.

14. The method as recited in claim 8, wherein an index number and the global value are maintained by atomic counters, and wherein the method further comprising each wavefront of the first plurality of wavefronts:

implementing a spinlock waiting for the index number to equal the first threshold, wherein the first threshold is equal to a thread number of a first thread of the wavefront;

updating the global value responsive to the index number equaling the first threshold; and setting the index number equal to a second threshold responsive to updating the global value, wherein the second threshold is equal to a thread number of a first thread of a subsequent wavefront.

15. A system comprising:

a memory; and a processor coupled to the memory;

wherein the processor is configured to:

initiate execution of a first and second plurality of wavefronts in parallel on the plurality of compute units, wherein each of the second plurality of wavefronts comprise program instructions executable to generate image data corresponding to an image;

execute a first wavefront of the first plurality of wavefronts to convert a first local coordinate into a first global coordinate, wherein the first local coordinate is generated with respect to a first portion of a primitive of the image and the first global coordinate is generated with respect to an entirety of the primitive and is equal to the first local coordinate added to a global value;

execute a first wavefront of the second plurality of wavefronts to apply a first attribute to the first global coordinate prior to a second wavefront, of the first plurality of wavefronts, converting a second local coordinate of a second portion of the primitive into a second global coordinate; and convey the image data for display on a display device.

16. The system as recited in claim 15, wherein:

the first global coordinate is a stipple coordinate; and generating the first local coordinate comprises projecting a distance of the first portion of the line onto a screen space representative of the display device.

17. The system as recited in claim 15, wherein the primitive is a line.

18. The system as recited in claim 17, wherein:

the first wavefront, of the first plurality of wavefronts, processes the first portion of the line;

a second wavefront, of the first plurality of wavefronts, processes the second portion of the line;

the second portion is adjacent to the first portion;

the first wavefront, of the second plurality of wavefronts, maintains continuity between the first portion and the second portion by applying a line stipple pattern to the second portion; and the line stipple pattern is determined based on the first global coordinate after the first wavefront adds the first local coordinate to the global value.

19. The system as recited in claim 15, wherein:

the processor is configured to initiate execution of the first and second plurality of wavefronts responsive to detecting a request to perform a line stipple operation;

each wavefront, of the second plurality of wavefronts, comprises program instructions which are executable by the processor to apply a line stipple pattern to a plurality of line segments being rasterized by the plurality of threads of a corresponding wavefront of the first plurality of wavefronts;

the first plurality of wavefronts are vertex shader wavefronts; and the second plurality of wavefronts are fragment shader wavefronts.

20. The system as recited in claim 15, wherein each wavefront of the first plurality of wavefronts is assigned an in-order, ascending range of vertex identifiers (IDs), wherein each wavefront of the first plurality of wavefronts comprises program instructions which are executable by the processor to process vertices corresponding to the range of vertex IDs to calculate projected distances of a plurality of portions of the primitive.

* * * * *